(12) United States Patent
Son et al.

(10) Patent No.: US 12,176,558 B2
(45) Date of Patent: *Dec. 24, 2024

(54) BATTERY MODULE

(71) Applicants: HYUNDAI MOTOR COMPANY, Seoul (KR); KIA CORPORATION, Seoul (KR)

(72) Inventors: In Gook Son, Hwaseong-si (KR); Yun Ho Kim, Suwon-si (KR); Jong Wook Lee, Hwaseong-si (KR); Yeon Man Jeong, Yongin-si (KR); Tae Hyuck Kim, Asan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,745

(22) Filed: Sep. 15, 2023

(65) Prior Publication Data

US 2024/0006698 A1 Jan. 4, 2024

Related U.S. Application Data

(63) Continuation of application No. 17/410,110, filed on Aug. 24, 2021, now Pat. No. 11,799,160.

(30) Foreign Application Priority Data

Sep. 25, 2020 (KR) .......................... 10-2020-0124710

(51) Int. Cl.
*H01M 50/209* (2021.01)
*H01M 10/42* (2006.01)
(Continued)

(52) U.S. Cl.
CPC ....... *H01M 50/209* (2021.01); *H01M 10/425* (2013.01); *H01M 10/486* (2013.01);
(Continued)

(58) Field of Classification Search
CPC ........... H01M 50/209; H01M 10/6556; H01M 50/507; H01M 50/1245; H01M 50/148; H01M 10/425; H01M 10/486
See application file for complete search history.

(56) References Cited

U.S. PATENT DOCUMENTS 5,639,571 A * 6/1997 Waters .............. H01M 10/6563
180/68.5
11,799,160 B2 * 10/2023 Son ..................... H01M 50/209
(Continued)

FOREIGN PATENT DOCUMENTS

KR 20120062260 A 6/2012
KR 20190124368 A 11/2019
(Continued)

*Primary Examiner* — Alexander Usyatinsky
(74) *Attorney, Agent, or Firm* — Lempia Summerfield Katz LLC

(57) ABSTRACT

A battery module includes a plurality of battery cells stacked on one another in a first direction and configured to form a stacked structure. In particular, some battery cells of the plurality of battery cells are coated with hot melt respectively interposed between some battery cells of the plurality of battery cells to fix the battery cells. The battery module further includes a pair of end plates that surface-contact with opposite end battery cells of the stacked structure; and a pair of bus bar assemblies arranged at opposite ends of the stacked structure in a second direction perpendicular to the first direction and configured to connect electrodes of the plurality of battery cells located at opposite ends in the second direction to each other.

15 Claims, 17 Drawing Sheets

(51) Int. Cl.
  *H01M 10/48*  (2006.01)
  *H01M 10/6556*  (2014.01)
  *H01M 50/124*  (2021.01)
  *H01M 50/148*  (2021.01)
  *H01M 50/507*  (2021.01)

(52) U.S. Cl.
  CPC ... *H01M 10/6556* (2015.04); *H01M 50/1245* (2021.01); *H01M 50/148* (2021.01); *H01M 50/507* (2021.01)

(56) References Cited

U.S. PATENT DOCUMENTS

| | | | | |
|---|---|---|---|---|
| 2013/0323549 | A1* | 12/2013 | Choi | H01M 50/507 |
| | | | | 429/62 |
| 2014/0134462 | A1* | 5/2014 | Choi | H01M 10/482 |
| | | | | 429/61 |
| 2017/0279094 | A1* | 9/2017 | Ueda | H01M 50/209 |
| 2018/0287111 | A1* | 10/2018 | Fukuoka | H01M 50/289 |
| 2019/0115572 | A1* | 4/2019 | Fees | B60K 1/04 |
| 2019/0296294 | A1* | 9/2019 | Hirschbeck | H01M 50/209 |
| 2020/0067040 | A1* | 2/2020 | Kim | H01M 50/211 |
| 2021/0036270 | A1* | 2/2021 | Motohashi | H01M 10/647 |
| 2021/0083244 | A1 | 3/2021 | Cho et al. | |

FOREIGN PATENT DOCUMENTS

| | | | |
|---|---|---|---|
| WO | 2019198518 | A1 | 10/2019 |
| WO | WO 2019198518 | * | 10/2019 |
| WO | 2019245214 | A1 | 12/2019 |

* cited by examiner

BATTERY MODULE

CROSS REFERENCE TO RELATED APPLICATION

This application is a continuation application of non-provisional U.S. patent application Ser. No. 17/410,110, filed on Aug. 24, 2021, which claims priority to and the benefit of Korean Patent Application No. 10-2020-0124710, filed on Sep. 25, 2020, the entire contents of each of which are incorporated herein by reference.

FIELD

The present disclosure relates to a battery module and a battery pack including the same.

BACKGROUND

The statements in this section merely provide background information related to the present disclosure and may not constitute prior art.

Recently, in accordance with the global trend of reducing carbon dioxide emissions, there has been increasing demand for electric vehicles that generate driving power by driving a motor using electric energy stored in an energy storage device such as a battery instead of a typical internal combustion engine vehicle that generates driving power through combustion of fossil fuels.

The performance of electric vehicles is highly dependent upon the capacity and performance of the battery corresponding to an energy storage device that stores electrical energy provided to a driving motor.

We have discovered that a battery for a vehicle for storing electrical energy supplied to a motor in order to generate driving power of the vehicle needs to have excellent electrical properties, such as excellent charge and discharge performance and long use lifespan, and to also provide performance at a high level in terms of a mechanical aspect, which is robust to a severe driving environment, such as high temperature and high vibration.

We have found that it is advantageous to configure hardware of a battery in the form of a module having a standardized size and capacity so as to be consistently applied to various types of vehicles from a point of view of manufacturers of vehicles.

The contents described as the related art have been provided only to assist in understanding the background of the present disclosure and should not be considered as corresponding to the related art known to those having ordinary skill in the art.

SUMMARY

The present disclosure provides a battery module having a standardized size and capacity to be consistently applied to various types of vehicles, and a battery pack including the battery module.

In particular, the present disclosure provides a battery module and a battery pack including the battery module for stably maintaining a stacked structure of stacked battery cells.

According to an exemplary form of the present disclosure, a battery module includes: a plurality of battery cells stacked on one another in a first direction and configured to form a stacked structure, wherein some battery cells of the plurality of battery cells are coated with hot melt respectively interposed between battery cells of the plurality of battery cells to fix the battery cells of the plurality of battery cells; and a pair of end plates that respectively surface-contact with opposite end battery cells of the stacked structure in the first direction.

The stacked structure may include a plurality of cell assemblies including a pair of battery cells stacked across a surface pressure pad interposed therebetween, and the plurality of cell assemblies may be stacked in the first direction.

In the cell assembly, the battery cells may be stacked to position respective electrodes having the same polarity adjacent to each other.

The cell assemblies in the stacked structure may be stacked on one another to arrange respective electrodes having different polarities adjacent to each other.

The hot melt may be coated between the stacked cell assemblies.

The hot melt may be coated to have a plurality of rows in a direction parallel to a lengthwise side of a bonding surface of the battery cells that surface-contact each other.

The hot melt may be coated in a matrix pattern having a plurality of columns and a plurality of rows parallel to each side of a bonding surface of the battery cells that surface-contact each other.

The battery module may further include a pair of bus bar assemblies arranged at opposite ends of the stacked structure in a second direction perpendicular to the first direction and for connecting electrodes of the plurality of battery cells to each other, a first cover for covering one surface of the stacked structure in a third direction perpendicular to the first direction and the second direction, a first clamp including opposite ends that are respectively bonded to the pair of end plates across the first cover at an outside of the first cover, and a second clamp including opposite ends that are respectively bonded to the pair of end plates across a surface of the stacked structure, which faces the surface on which the first cover is disposed.

Each of the pair of end plates may include an internal plate that surface-contacts the stacked structure and is formed of an insulation material, and an external plate that covers the internal plate at an outside of the internal plate and has higher rigidity than the internal plate.

The external plate may include an insert space that is formed at an end adjacent to the first cover and into which a temperature sensor spaced apart from the stacked structure at a predetermined interval is inserted.

The bus bar assembly may include a bus bar including a plurality of slits, and regions of the electrodes of the plurality of battery cells, which are positioned through the slits, may be bent and connected to the bus bar.

The bus bar assemblies may include a circuit for detecting a voltage of the battery cell.

The first clamp may be bonded to the first cover, and the opposite ends of the first clamp may be bent to respectively face the pair of end plates and to be bonded to outer surfaces of the end plates.

The opposite ends of the second clamp may be bent to face the pair of end plates and to be bonded to outer surfaces of the end plates.

The battery module may further include second and third covers for covering the stacked structure in the second direction at an outside of the pair of bus bar assemblies, respectively.

According to another form of the present disclosure, a battery pack may include a battery module including a plurality of battery cells stacked on one another in a first direction, hot melt being coated and fixing between at least some of the plurality of battery cells, a pair of end plates that surface-contact opposite ends in the first direction of a stacked structure in which the plurality of battery cells is stacked and fix a distance therebetween, a pair of bus bar assemblies arranged at opposite ends of the stacked structure in a second direction perpendicular to the first direction and for connecting electrodes of the plurality of battery cells located at opposite ends in the second direction to each other, a first cover for covering one surface of the stacked structure in a third direction perpendicular to the first direction and the second direction, a first clamp including opposite ends that are respectively bonded to the pair of end plates across the first cover at an outside of the first cover, and a second clamp including opposite ends that are respectively bonded to the pair of end plates across a surface of the stacked structure, which faces the surface on which the first cover is disposed, and a case including an accommodation surface on which the battery module is accommodated, wherein the stacked structure is exposed through one surface of the battery module, which faces the surface on which the first cover is disposed, the battery module is disposed to position the exposed stacked structure and the accommodation surface to face each other, and a gap filler is interposed between the stacked structure and the accommodation surface.

The case may further include a cooling channel through which cooling water flows at a lower portion of the accommodation surface.

The stacked structure may include a plurality of cell assemblies including a pair of battery cells stacked across a surface pressure pad interposed therebetween, the plurality of cell assemblies may be stacked in the first direction, and the hot melt may be coated between the stacked cell assemblies.

The hot melt may be coated to have a plurality of rows in a direction parallel to a lengthwise side of a bonding surface of the battery cells that surface-contact each other.

The hot melt may be coated in a matrix pattern having a plurality of columns and a plurality of rows parallel to each side of a bonding surface of the battery cells that surface-contact each other.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
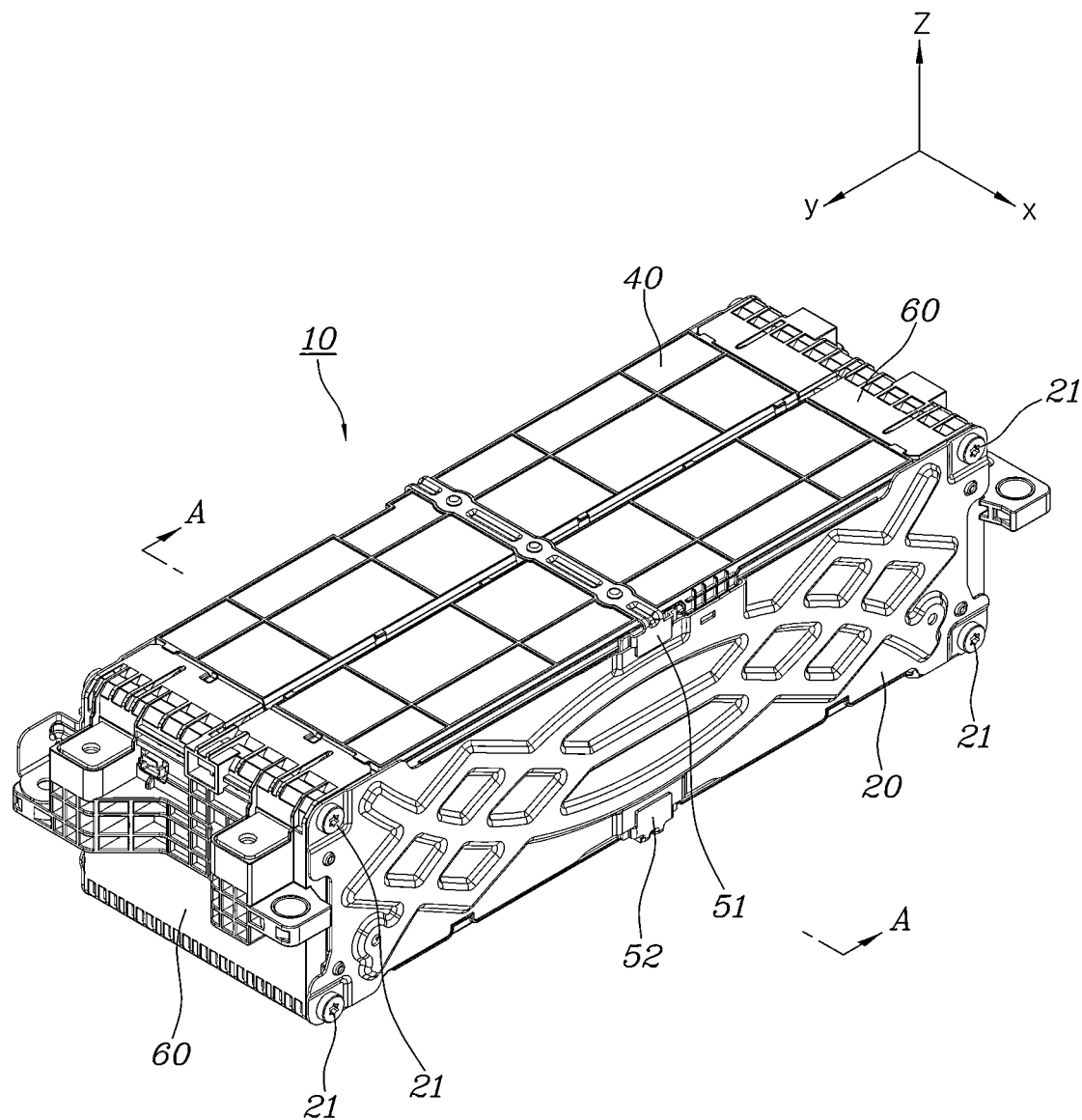
FIG. 1 is a perspective view of a battery module viewed from above according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a battery module and a battery pack including the same according to exemplary forms of the present disclosure will be described in detail with reference to the attached drawings.

Figure 2:
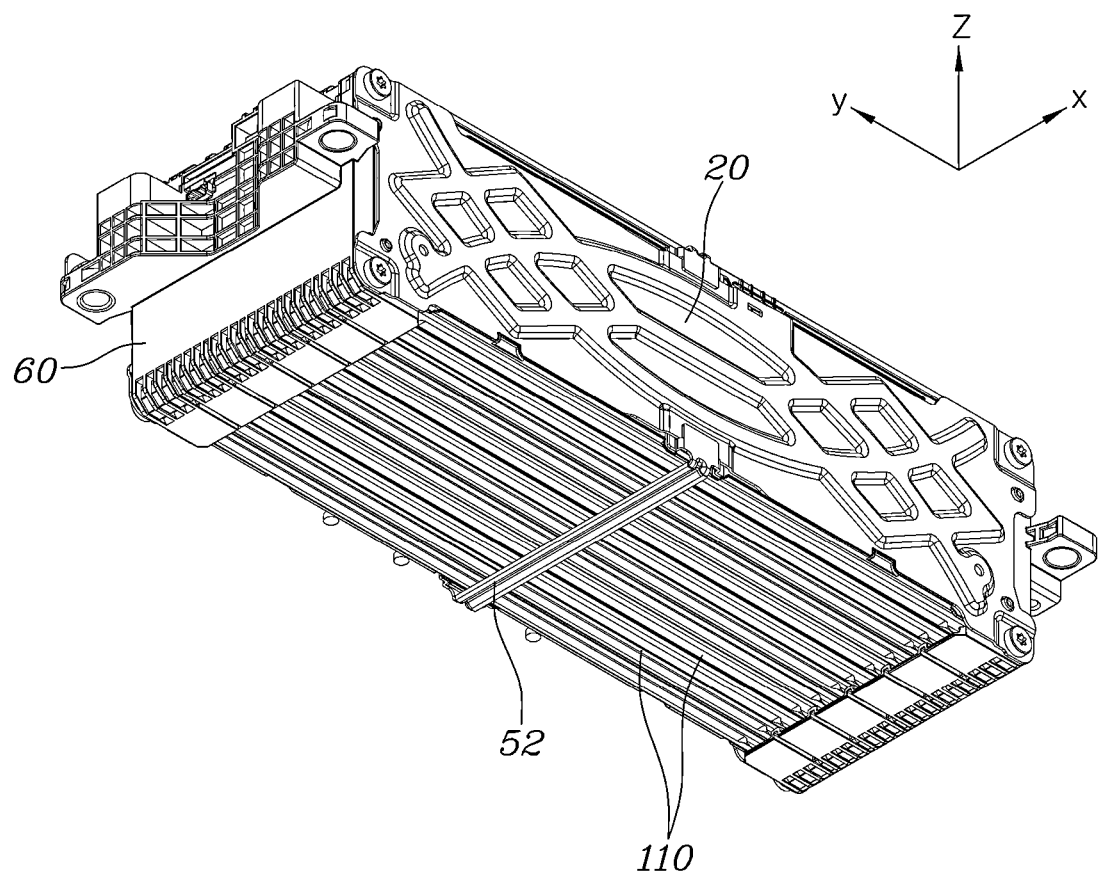
FIG. 2 is a perspective view of the battery module shown in FIG. 1 viewed from below.
Figure 3:
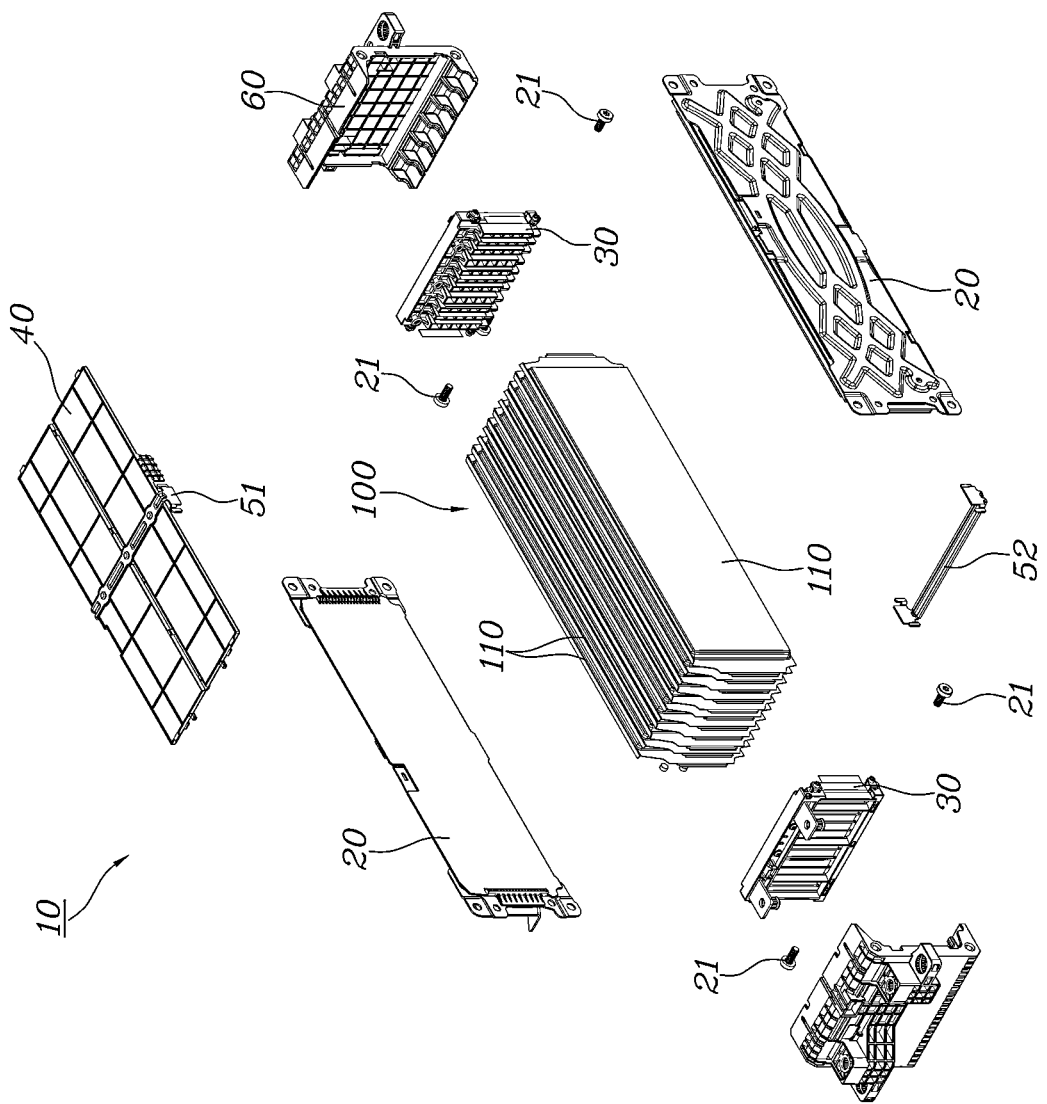
FIG. 3 is an exploded perspective view of the battery module shown in FIG. 1.

FIG. 1 is a perspective view of a battery module viewed from above according to an exemplary form of the present disclosure. FIG. 2 is a perspective view of the battery module shown in FIG. 1 viewed from below. FIG. 3 is an exploded perspective view of the battery module shown in FIG. 1.

Referring to FIGS. 1 to 3, a battery module 10 according to an exemplary form of the present disclosure may include: a plurality of battery cells 110 stacked on one another in a first direction (an x-axis direction), a pair of end plates 20 that are respectively surface-bonded to two opposite end battery cells in the first direction of a stacked structure 100 of the plurality of battery cells 110, a pair of bus bar assemblies 30 that are arranged at opposite ends in a second direction (a y-axis direction) perpendicular to the first direction of the stacked structure 100 of the battery cells 110 and that connect electrodes of the plurality of battery cells 110 to each other, a first cover 40 that covers one surface of the stacked structure 100 of the plurality of battery cells 110 in a third direction (a z-axis direction) perpendicular to the first direction and the second direction, a first clamp 51 having opposite ends that are respectively bonded to the pair of end plates 20 across the first cover 40 at the outside of the first cover 40, and a second clamp 52 having opposite ends that are respectively bonded to the two end plates 20 across a surface of the stacked structure 100 of the plurality of battery cells 110, which faces the surface on which the first cover 40 is disposed.

In addition, the battery module according to an exemplary form of the present disclosure may include second and third covers 60 that cover the stacked structure 100 of the battery cells 110 in the second direction at the outside of the bus bar assemblies 30, respectively.

Figure 4:
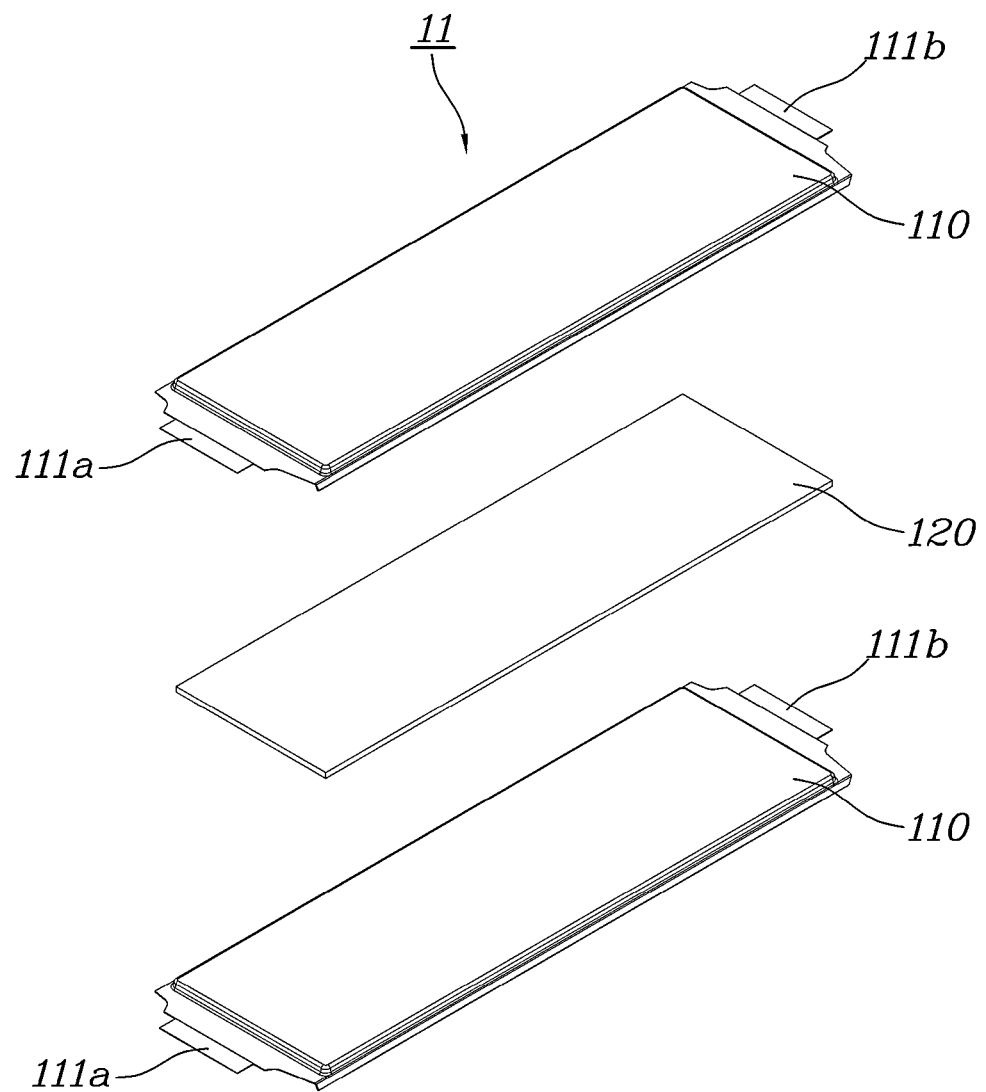
FIG. 4 is a perspective view showing the configuration of a cell assembly in a battery module according to an exemplary form of the present disclosure.
Figure 5:
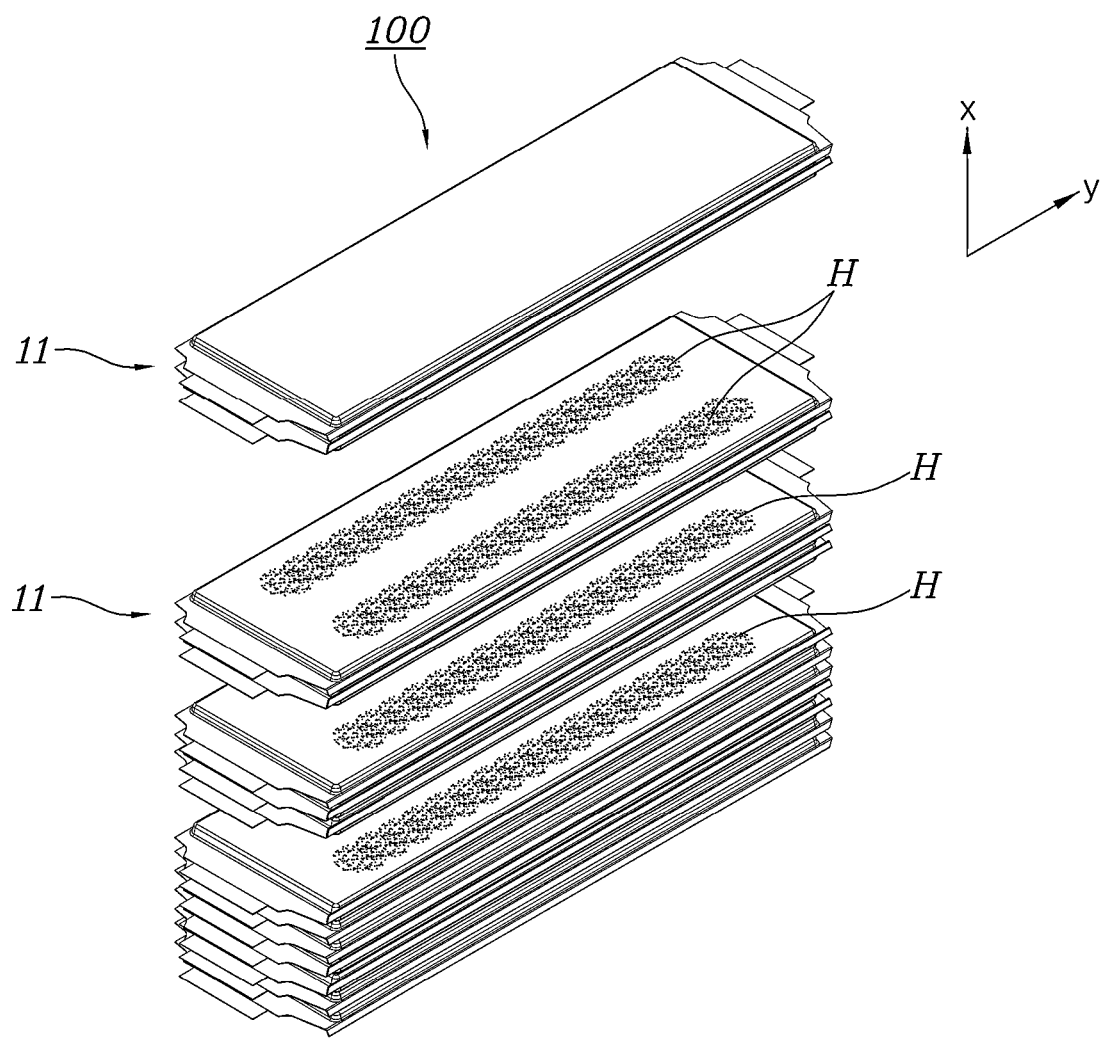
FIG. 5 is a perspective view showing the configuration of a stack structure of battery cells of a battery module according to another form of the present disclosure.

FIG. 4 is a perspective view showing the configuration of a cell assembly in a battery module according to an exemplary form of the present disclosure. FIG. 5 is a perspective view showing the configuration of a stack structure of battery cells of a battery module according to another form of the present disclosure.

As shown in FIG. 4, the stacked structure of the plurality of battery cells 110 may include a cell assembly 11 including the two battery cells 110 and a surface pressure pad 120 interposed therebetween by stacking one battery cell 110, a surface pressure pad 120, and another battery cell 110 on one another. That is, as shown in FIG. 5, the stacked structure 100 may be manufactured by stacking the plurality of cell assemblies 11 shown in FIG. 4.

In one cell assembly 11 of a battery, the battery cells 110 may be arranged to position respective electrodes having the same polarity (e.g., positive electrodes 111*a* or negative electrodes 111*b*) adjacent to each other.

The surface pressure pad 120 may be an element for preventing the structure of the module from being deformed by providing flexibility when swelling of the battery cells 110 occurs.

The plurality of cell assemblies 11 may be stacked on one another by interposing hot melt H therebetween. The hot melt H may be a kind of liquid binder for achieving adhesion when applied with heat, and may be coated in a preset pattern on a surface of the battery cell 110 before the plurality of cell assemblies 11 is stacked on one another, and in this regard, the desired positional relationship between the battery cells may be achieved by aligning the battery cells and applying heat at one time after stacking the cell assemblies 11.

Conventionally, a double-sided adhesive tape is mainly used to form a stacked structure of a battery. When the double-sided adhesive tape is applied, this is disadvantageous to miniaturize the stacked structure due to a thickness of the tape. When the double-sided adhesive tape is applied, a stripe process of the tape needs to be added, and thus it may be disadvantageous in terms of a process of a battery module. In the case of the double-sided adhesive tape, there is a limit in adhesive strength, and thus when a load is applied to a stacked structure during a process of manufacturing a battery module, there is a serious problem in that alignment of stacked battery cells is destroyed. If such a problem occurs in alignment of the battery cells, a gap filler interposed between a battery cell and a bottom surface of a case of the battery pack does not come in contact with a portion of the battery cell when a battery module is accommodated in the battery pack, and thus a problem occurs in that heat generated in the battery cells is not easily dissipated.

On the other hand, according to an exemplary form of the present disclosure, the size of a gap desired to bond battery cells may be reduced and a separate strip process may not be required by applying hot melt to be coated in a liquid state. In addition, appropriate adhesive strength between the stacked battery cells may be provided by appropriately adjusting the material and coating form of the hot melt, and simultaneously, a reduction in the weight of the battery cells may be facilitated by optimizing the usage of the hot melt.

Figure 6:
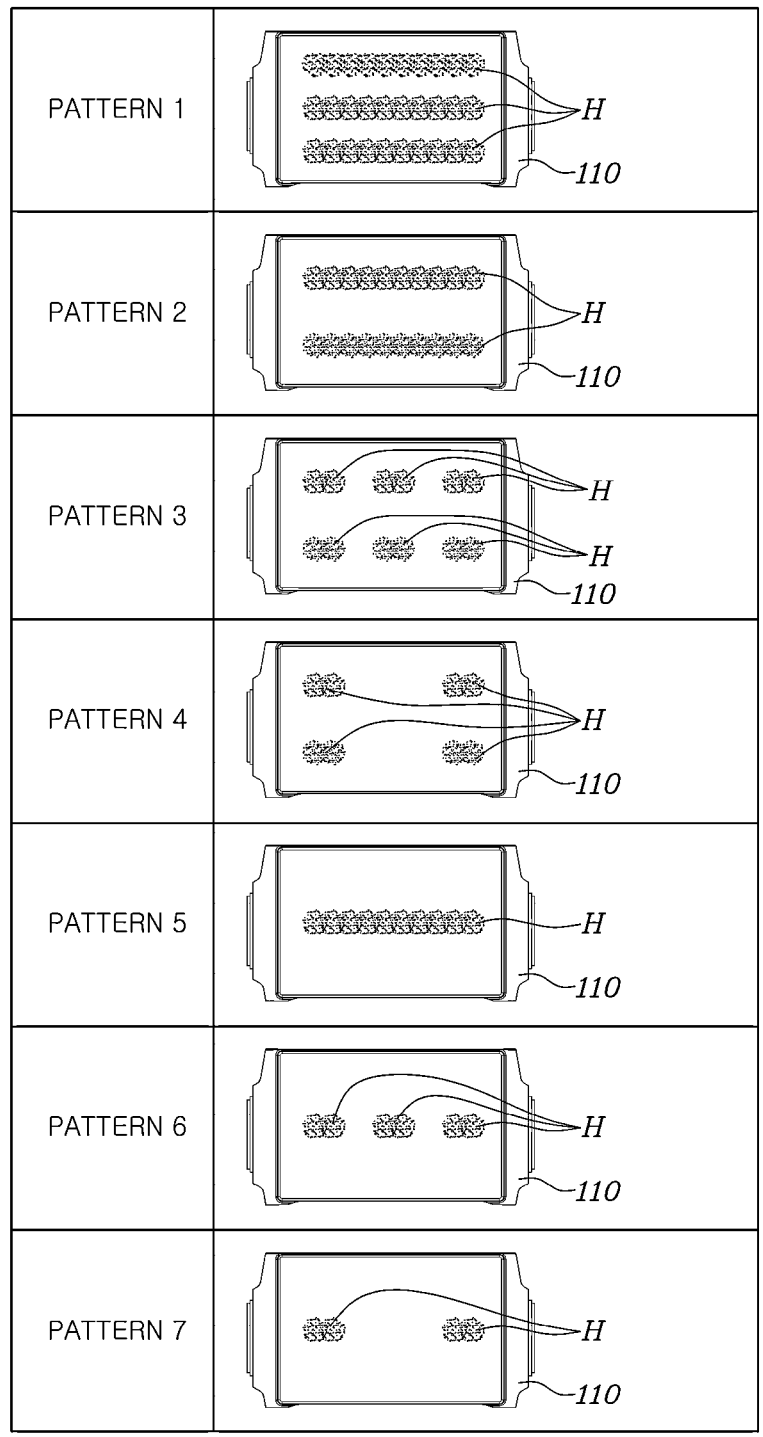
FIG. 6 is a diagram showing an example of a coating pattern of hot melt coated between battery cells in a battery module according to exemplary forms of the present disclosure.

FIG. 6 is a diagram showing an example of a coating pattern of hot melt coated between battery cells in a battery module according to another form of the present disclosure.

An inventor of the present disclosure applied shearing force in a direction parallel to a bonding surface of a battery cell and tested whether bonding is destroyed after applying a total of seven patterns, coating hot melt, and manufacturing a stacked structure, as shown in FIG. 6.

Pattern 1 of FIG. 6 corresponds to an example in which the hot melt H is coated to have three rows parallel to a lengthwise side (a side formed in the second direction) of the battery cells 110. In the case of this pattern, hot melt may be coated in a wide region to achieve sufficient adhesive strength. However, pattern 1 may be disadvantageous due to a high weight of the coated hot melt H compared with other coated patterns.

Pattern 2 of FIG. 6 corresponds to an example in which the hot melt H is coated to have two rows parallel to a lengthwise side (a side formed in the second direction) of the battery cells 110. In the case of this pattern, adhesive strength may be relatively degraded compared with pattern 1, but relatively satisfactory adhesive strength may be achieved, and pattern 2 may be more advantageous than pattern 1 in that the weight of the hot melt H is reduced compared with Pattern 1.

Pattern 3 of FIG. 6 corresponds to an example in which the hot melt H is coated in a matrix pattern having two rows and three columns parallel to respective sides of the bonding surface of the battery cell 110. In the case of this pattern, adhesive strength may be relatively degraded compared with pattern 2, but the weight of the hot melt H may be further reduced while providing appropriate adhesive strength at a desired level, and thus pattern 3 may be more advantageous than patterns 1 and 2.

Pattern 4 of FIG. 6 corresponds to an example in which the hot melt H is coated in a matrix pattern having two rows and two columns parallel to respective sides of the bonding surface of the battery cell 110 and coating of hot melt is omitted at a portion corresponding to the center in the second direction. It may not be possible to apply this pattern in that the shape of a battery surface is not uniform when battery cells are bonded.

Pattern 5 of FIG. 6 corresponds to an example in which the hot melt H is coated in one row parallel to a lengthwise side of the battery cell 110 and pattern 6 of FIG. 6 corresponds to an example in which the hot melt H is coated in a pattern having one row and three columns. It may not be possible to apply patterns 5 and 6 in that bonding is destroyed due to application of shearing force.

Pattern 7 of FIG. 6 corresponds to an example in which the hot melt H is coated in a pattern having one row parallel to a lengthwise side and two columns. It may not be possible to apply pattern 7 in that the shape of a battery surface is not uniform when battery cells are bonded.

As seen from the test result of FIG. 6, it may be desirable that hot melt is coated in a pattern having a plurality of rows parallel to a lengthwise side of a bonding surface of a battery cell or a pattern of a matrix form having a plurality of rows and a plurality of columns parallel to each side of a bonding surface of a battery cell and that hot melt is coated on both an end portion and a central portion in a direction of the lengthwise side of the bonding surface.

The cell assemblies 11 in the stacked structure may be stacked on one another to arrange respective electrodes having different polarities adjacent to each other in order to achieve an electrical connection relationship in series between cell assemblies when the electrodes of the battery cells and bus bars of the bus bar assemblies 30, which will be described below, are connected to each other. That is, the battery cells in the cell assembly 11 may be electrically connected in series, and the cell assemblies 11 may be electrically connected in series.

Hereinafter, for convenience of description, a direction in which the battery cells 110 are stacked will be referred to as a first direction (an x-axis direction) and a direction perpendicular to the first direction, in which the electrodes of the battery cell 110 are connected to each other, will be referred to as a second direction (a y-axis direction). In addition, a direction perpendicular to the first direction and the second direction, that is, a direction in which sides on which electrodes of the battery cells 110 are not formed are connected to each other will be referred to as a third direction (a z-axis direction).

Figure 7:
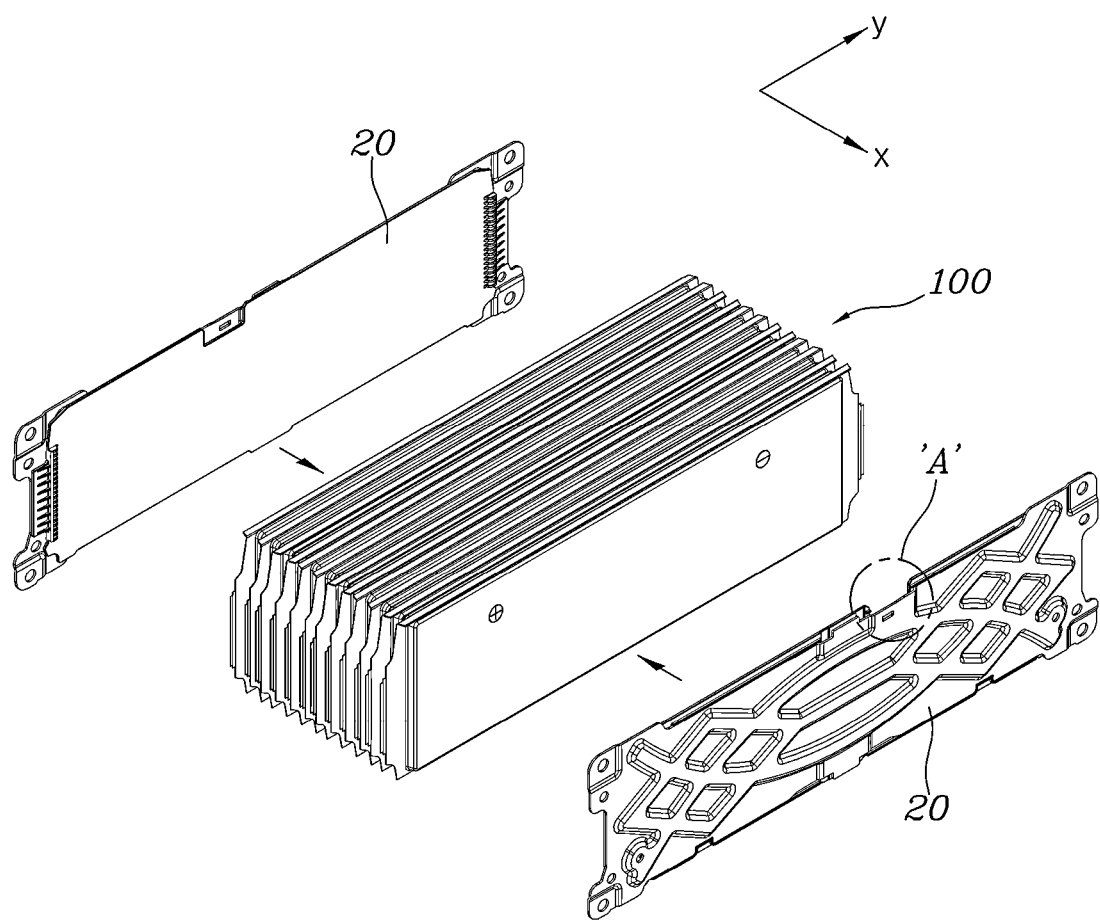
FIG. 7 is a perspective view showing a positional relationship between a stacked structure of battery modules and end plates according to one form of the present disclosure.

FIG. 7 is a perspective view showing a positional relationship between a stacked structure of battery modules and end plates according to an exemplary form of the present disclosure.

As shown in FIG. 7, the pair of end plates 20 may be arranged to surface-contact surfaces at opposite ends of the stacked structure 100 in the first direction as a stack direction of the stacked structure 100 of the battery cells, that is, exposed surfaces of the outermost battery cells among the plurality of battery cells 110 included in the stacked structure 100.

The pair of end plates 20 may be an element for maintaining an interval therebetween to prevent the battery module from being deformed and to uniformly maintain surface pressure between the stacked battery cells 110 due to the rigidity of the end plates 20 itself when swelling of the battery cells 110 occurs. Thus, the end plates 20 may also include an additional device that has sufficient rigidity to prevent the battery module from being deformed while maintaining surface-contact with the battery cells 110 and achieves the uniformity of surface pressure.

Figure 8:
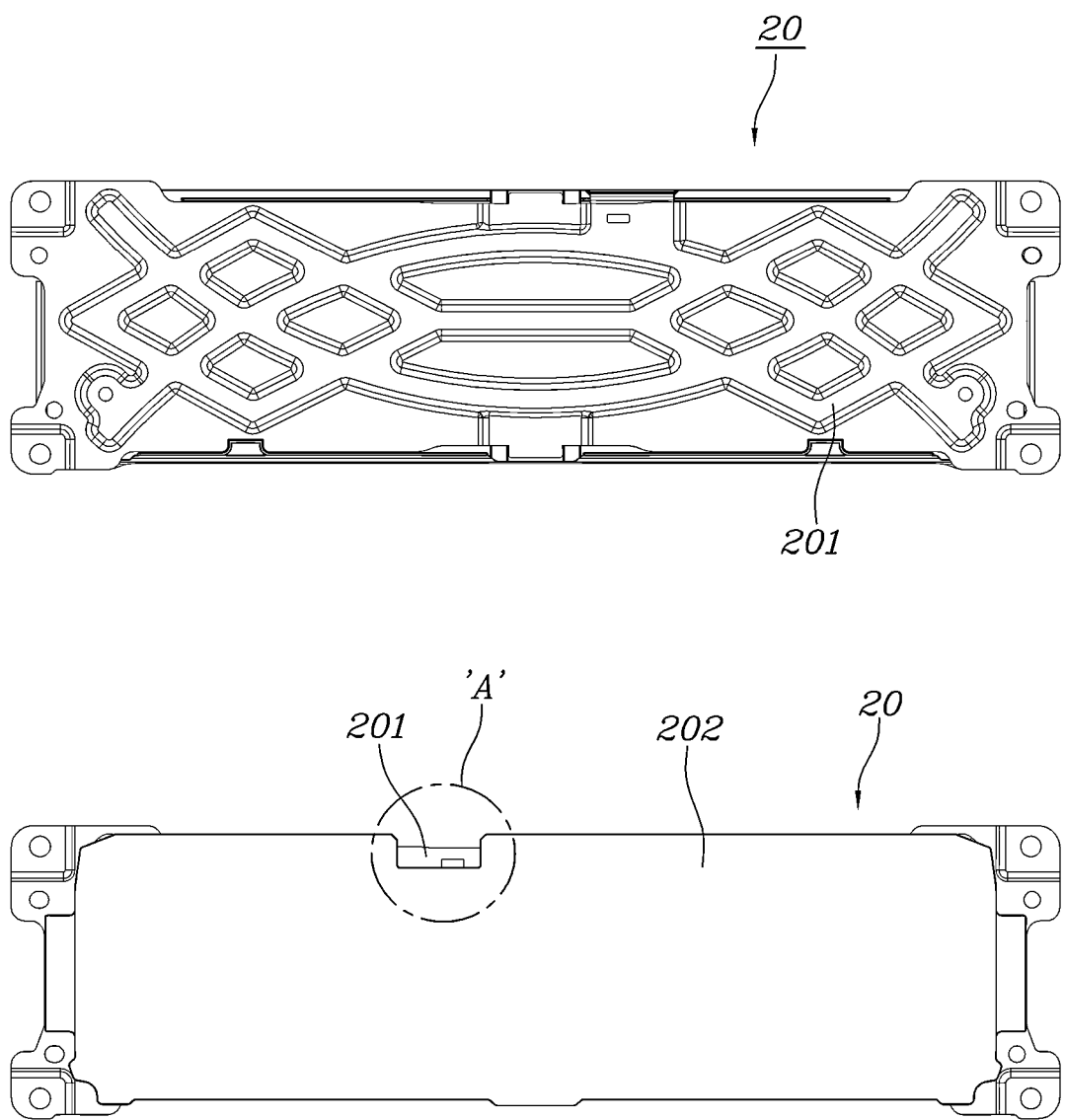
FIG. 8 is an enlarged plan view of an outer surface and an inner surface of the end plate shown in FIG. 7.

FIG. 8 is an enlarged plan view of an outer surface and an inner surface of the end plate shown in FIG. 7.

As shown in FIG. 8, each end plate 20 may include an external plate 201 exposed outside the battery module 10 and an internal plate 202 that is covered by the external plate 201 and surface-contacts the stacked structure 100 of the battery. The external plate 201 may be formed of a metallic material to be lightweight while providing sufficient rigidity, and the internal plate 202 may be formed of an insulation material such as plastic, which has degraded rigidity compared with the external plate 201 but provides electric insulation when surface-contacting the outermost battery cells 110 of the stacked structure 100.

Figure 9:
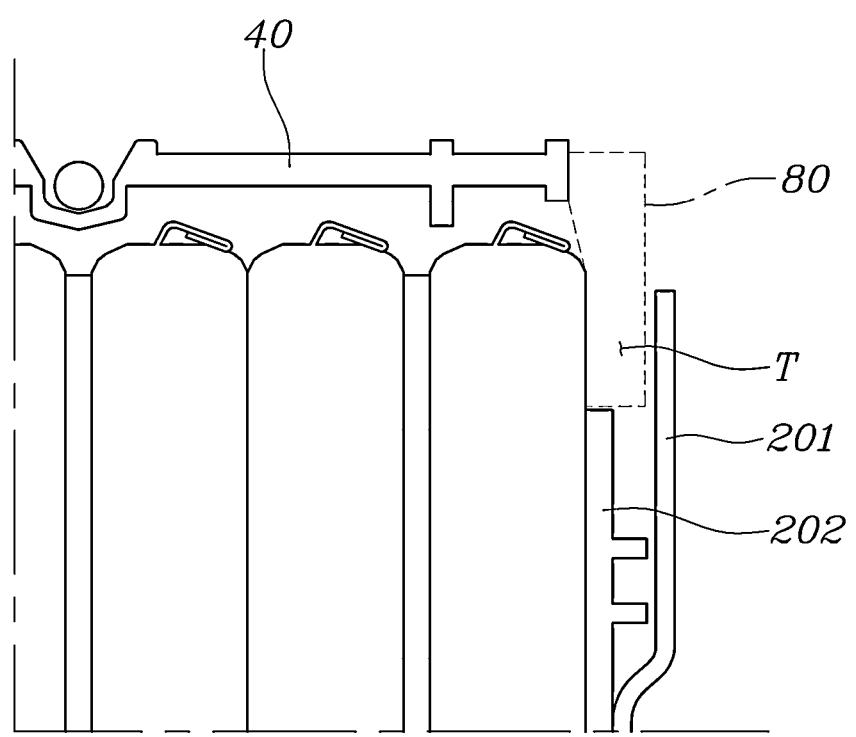
FIG. 9 is a more detailed cross-sectional view showing an insert space formed on the external plate shown in FIG. 8.

FIG. 9 is a more detailed cross-sectional view showing an insert space formed on the external plate shown in FIG. 8.

According to an exemplary form, an insert space T into which a temperature sensor 80 spaced apart from the stacked structure 100 at a predetermined interval is inserted may be formed at a side positioned in the second direction of the external plate 201 of the end plate 20 using various metal molding technologies. A region in which the insert space T is formed may correspond to a portion 'A' shown in FIGS. 1, 7, and 8, and FIG. 9 is a cross-sectional view showing the portion 'A' taken along the first direction.

One battery pack may be embodied by arranging the plurality of battery modules 10 according to an exemplary form of the present disclosure in a case designed according to a vehicle type. In general, it is desired to recognize an internal temperature in order to manage a battery pack and a battery module is manufactured to have a temperature sensor installed therein. The battery module according to an exemplary form of the present disclosure may provide the space T for installing a temperature sensor therein after a plurality of battery modules is arranged in a case rather than having a temperature sensor in the module itself.

In particular, the battery module 10 according to an exemplary form of the present disclosure may not include a separate covering element on an opposite surface to a surface on which the first cover 40 is installed, a battery cell is exposed out of the opposite surface, and the surface through which the battery cells is exposed may be arranged to face a bottom surface of the case. Accordingly, the insert space T of the temperature sensor may be formed to provide a predetermined space between the stacked structure of the battery cells and the external plate 201 at an end of the external plate 201 adjacent to the first cover 40.

Figure 10:
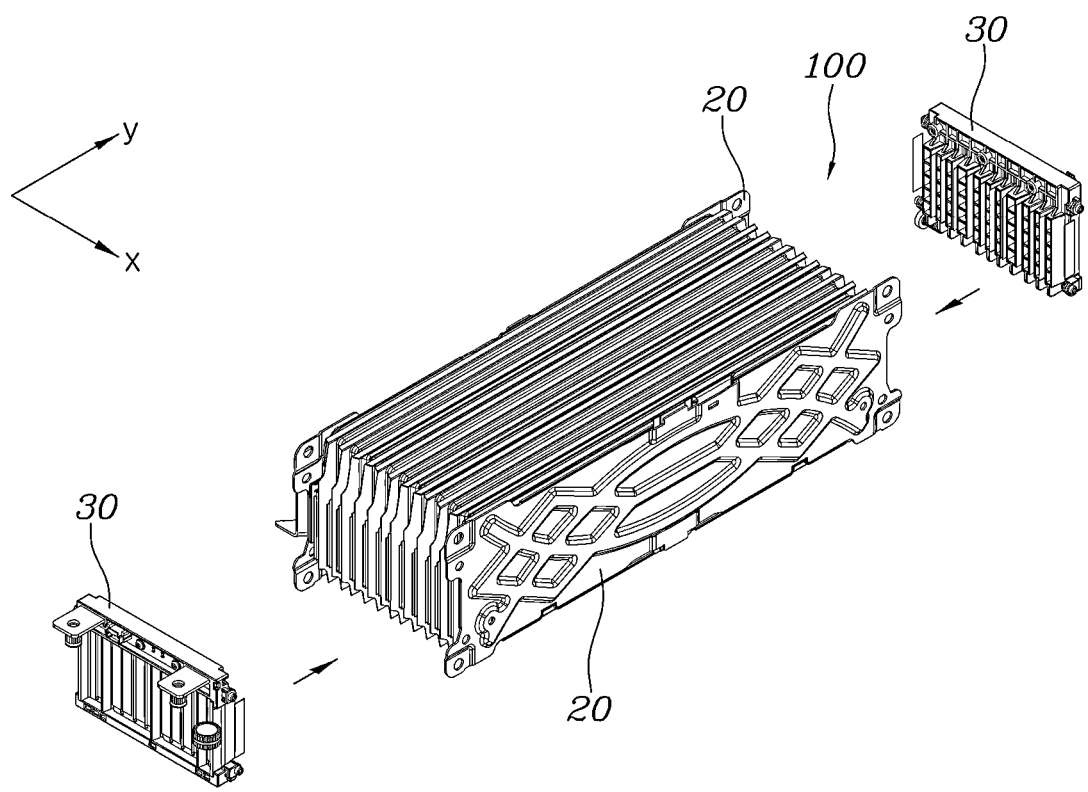
FIG. 10 is a perspective view showing a positional relationship between a stacked structure of battery modules and bus bar assemblies according to an exemplary form of the present disclosure.

FIG. 10 is a perspective view showing a positional relationship between a stacked structure of battery modules and bus bar assemblies according to another form of the present disclosure.

As shown in FIG. 10, the bus bar assemblies 30 may be installed at opposite ends in the second direction perpendicular to a direction in which the stacked structure 100 of battery cells is stacked, that is, in a direction in which the electrodes 111a and 111b of the battery cell 110 are connected to each other.

The bus bar assembly 30 may be an electrode including a bus bar for forming electrical connection between the electrodes 111a and 111b of the battery cells 110 in the stacked structure 100.

Figure 11:
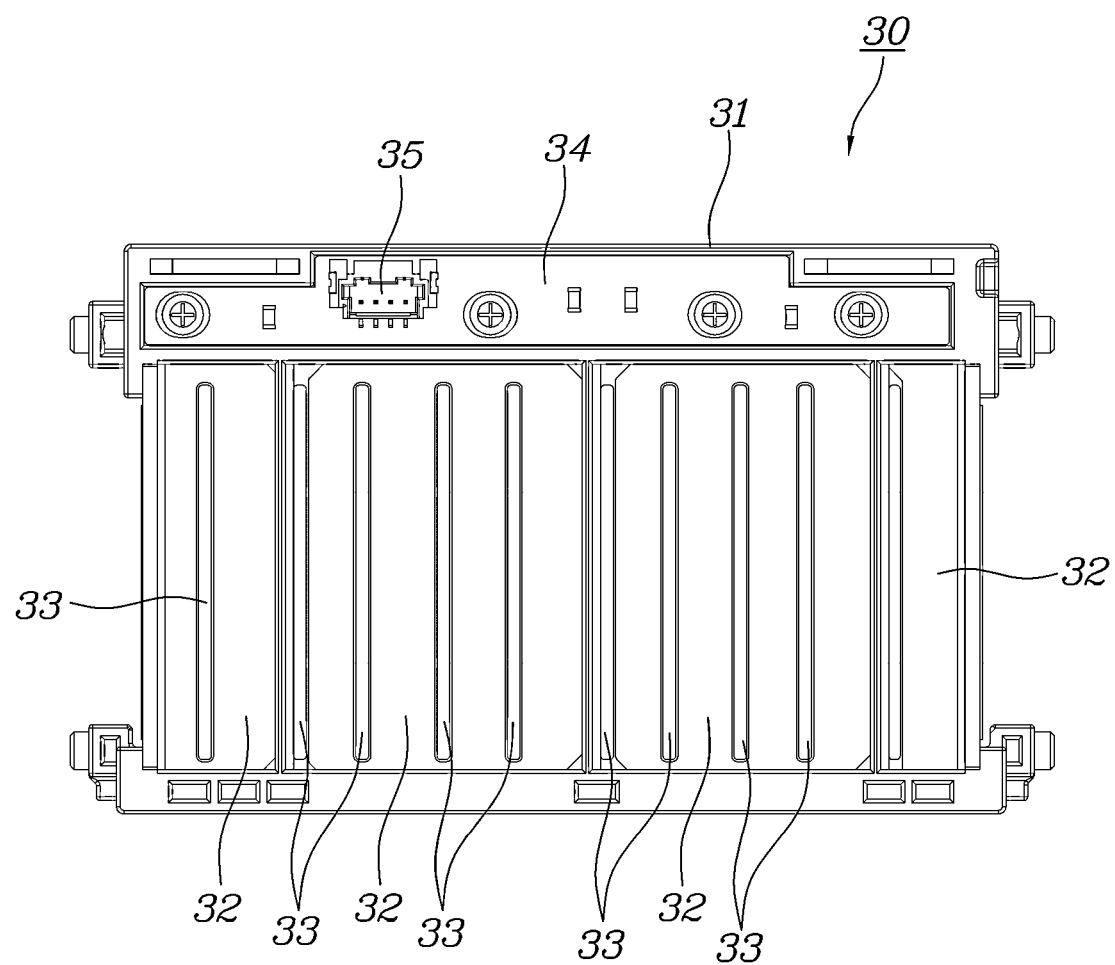
FIG. 11 is a more enlarged plan view of a bus bar assembly applied to a battery module according to an exemplary form of the present disclosure.
Figure 12:
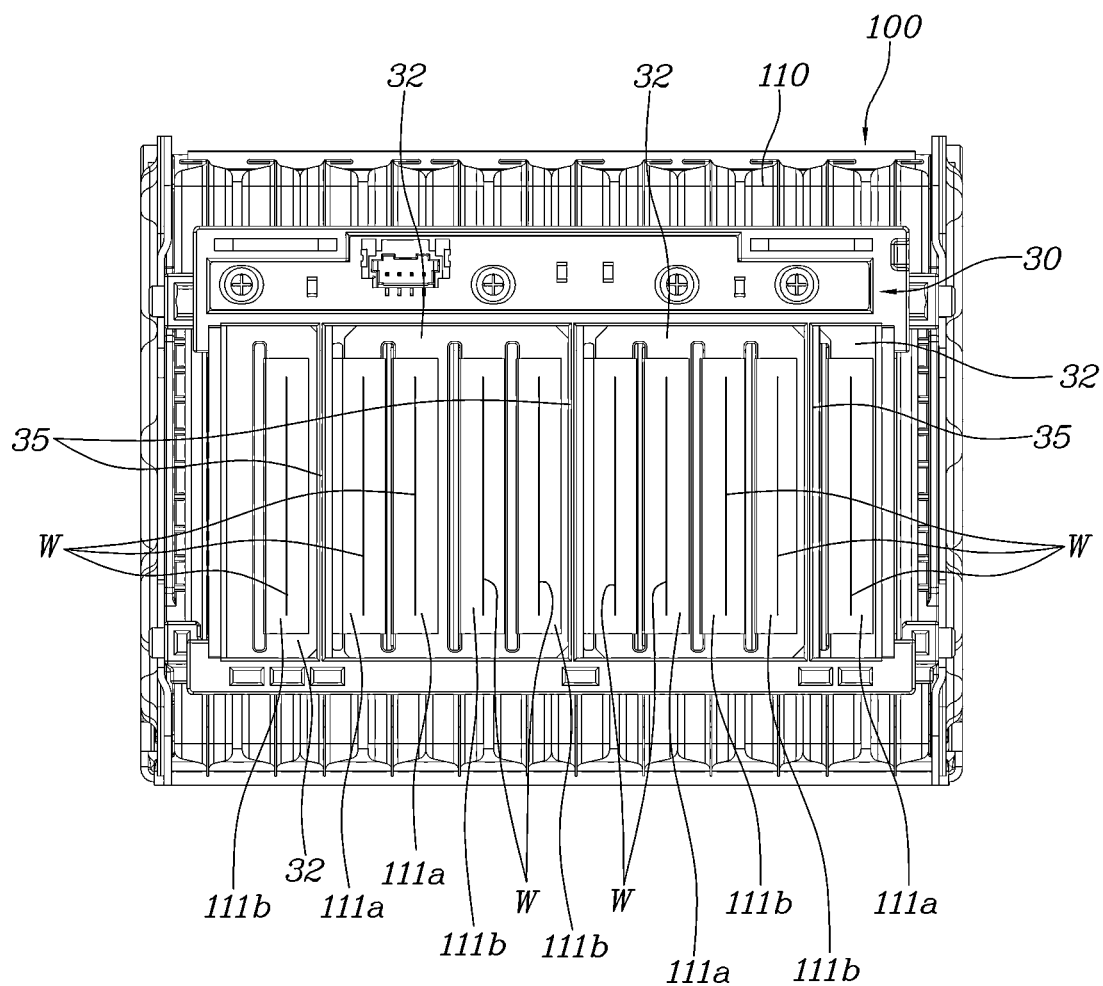
FIG. 12 is a plan view showing the state in which a bus bar of the bus bar assembly shown in FIG. 11 and electrodes of battery cells in a stacked structure are bonded to each other.

FIG. 11 is a more enlarged plan view of a bus bar assembly applied to a battery module according to an exemplary form of the present disclosure. FIG. 12 is a plan view showing the state in which a bus bar of the bus bar assembly shown in FIG. 11 and electrodes of battery cells in a stacked structure are bonded to each other.

As shown in FIG. 11, the bus bar assembly 30 may include a frame 31 formed of an insulation material such as plastic, and a bus bar 32 attached to the frame 31 and having slits 33 into which the electrodes 111a and 111b of the battery cells 110 are to be inserted. An interval between the slits 33 may correspond to an interval between the electrodes 111a and 111b of the battery cells 110 positioned in the stacked structure 100. The frame 31 may include a partition 35 formed between bus bars that need to be electrically insulated from each other.

The bus bar assembly 30 may include a circuit 34 for monitoring a voltage of the battery cell 110 included in the battery module. Here, the circuit 34 may include a circuit board such as a PCB, an electric device installed thereon, and the like.

As shown in FIG. 12, when the electrodes 111a and 111b of the battery cells 110 are inserted into the slits 33 formed in the bus bar 32 of the bus bar assembly 30, an entirety of the electrodes 111a and 111b of the battery cells 110 may be bent at one time and may come into contact with the bus bar 32, and then, the bus bar 32 and the electrodes 111a and 111b of the battery cells 110 may be bonded to each other through a single welding operation. In FIG. 12, reference numeral 'W' indicates a region which is irradiated with welding energy for welding.

In the case of a conventional battery module, electrical connection of a stacked structure of battery cells may be achieved by bending electrodes of a unit battery cell in advance and performing primary welding and then stacking the plurality of unit battery cells and performing secondary welding gain. Such a conventional method has a problem in that a plurality of bending and welding processes is performed and it is difficult to provide uniformity thereof, thus causing a step difference at a welding target during secondary welding.

However, as shown in FIG. 10, according to an exemplary form of the present disclosure, overall electrical connection between the battery cells in the battery module may be achieved through a single bending process and a single welding process by applying the bus bar assemblies 30, thereby simplifying a manufacturing process and improving product quality.

Figure 13:
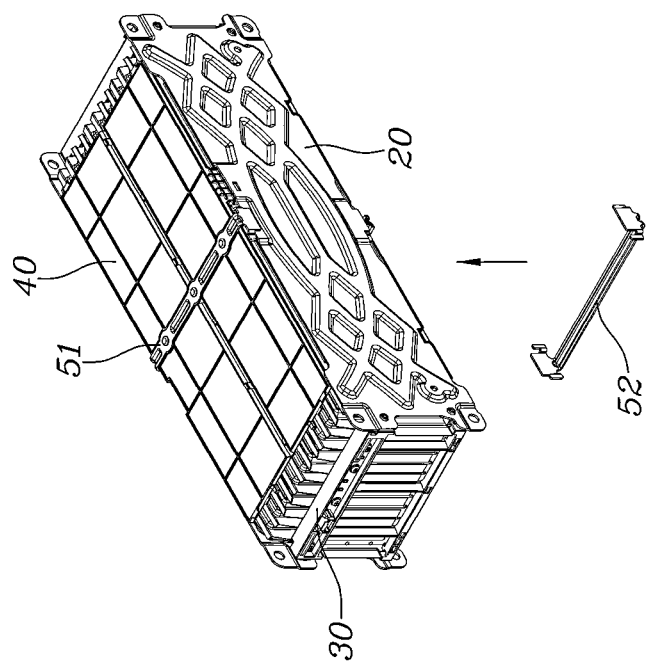
FIG. 13 is a perspective view showing a positional relationship of a cover, a first clamp, a second clamp, and a stacked structure of a battery module according to an exemplary form of the present disclosure.
Figure 13:
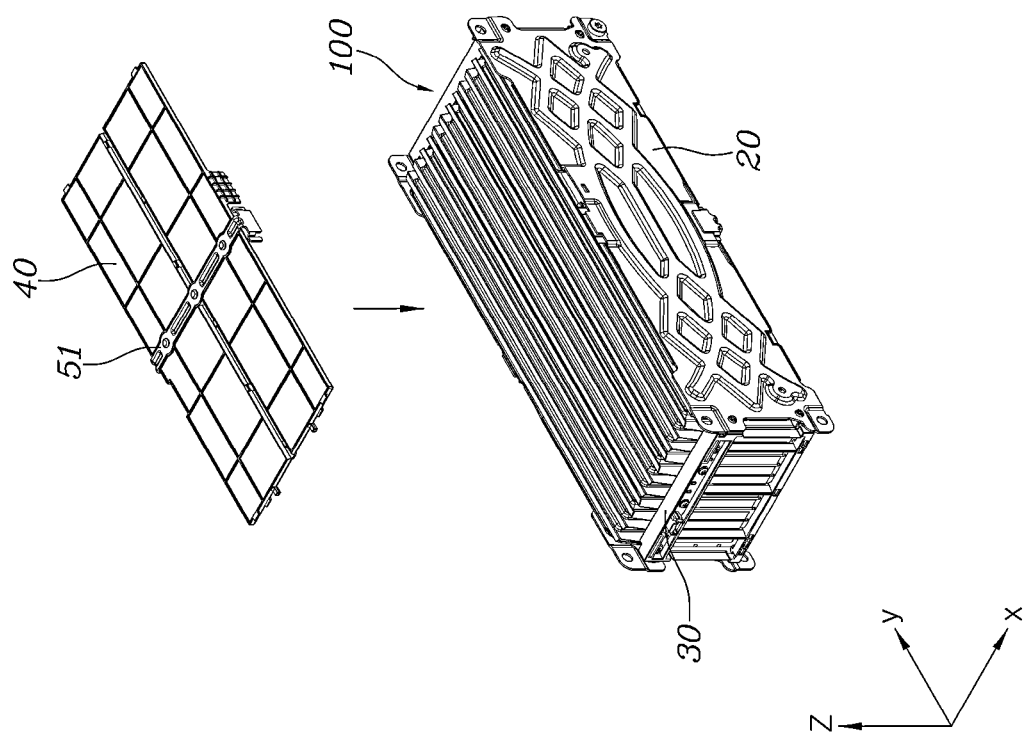

FIG. 13 is a perspective view showing a positional relationship of a cover, a first clamp, a second clamp, and a stacked structure of a battery module according to an exemplary form of the present disclosure.

As shown in FIG. 13, the first cover 40 may be disposed at one end of the stacked structure 100 in the third direction of the stacked structure 100 of battery cells.

The first clamp 51 configured in the form of a bar extending in the first direction may be disposed across the stacked structure 100 outside the first cover 40, and opposite ends of the first clamp 51 may be bonded to the pair of end plates 20, respectively.

The second clamp 52 configured in a bar extending in the first direction may be disposed adjacent to one surface facing the other surface of the stacked structure 100, on which the first cover 40 is disposed, across the stacked structure 100, and opposite ends of the second clamp 52 may be bonded to the pair of end plates 20, respectively.

The first clamp 51 may be fixed to the first cover 40 using a method such as thermal fusion, and the opposite ends of the first clamp 51 may be bonded to the two end plates 20, respectively, and thus a distance between the end plates 20 may also be maintained when swelling of the battery cells 110 occurs. The second clamp 52 may be spaced apart from the exposed surface of the stacked structure 100 (which is a lower surface in the drawing) adjacent thereto and may also maintain a distance between the two end plates 20 when swelling of the battery cells occurs, like the first clamp 51.

Figure 14:
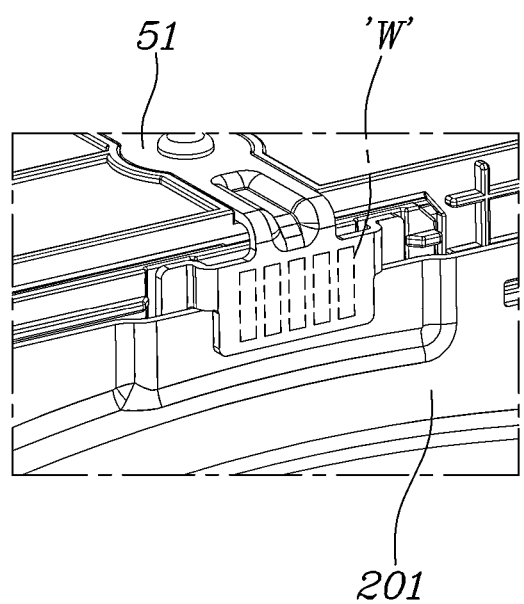
FIG. 14 is a diagram showing one end of the first clamp shown in FIG. 13.

FIG. 14 is a diagram showing one end of the first clamp shown in FIG. 13.

As shown in FIG. 14, an end of the first clamp 51 may be configured like a hook bent in a direction toward the end plate 20, and the bent end may face an outer surface of the end plate 20. The bent end may be welded to an outer surface adjacent to one side of the end plate 20 ('W': welding region) and may be fixed to the end plate 20. The bonding structure shown in FIG. 12 may also be applied to the second clamp 52 in the same way.

As such, a constant interval between the two end plates may be maintained at the center in the second direction of the end plate and the rigidity from the end plates may be applied to the battery cells inside the end plates by bonding the first clamp 51 to one side (an upper side in the drawing) of each of the two end plate 20 and bonding the second clamp 52 to a side (a lower side in the drawing) of each of the two end plate 20, which faces the side to which the first clamp 51 is bonded.

Figure 15:
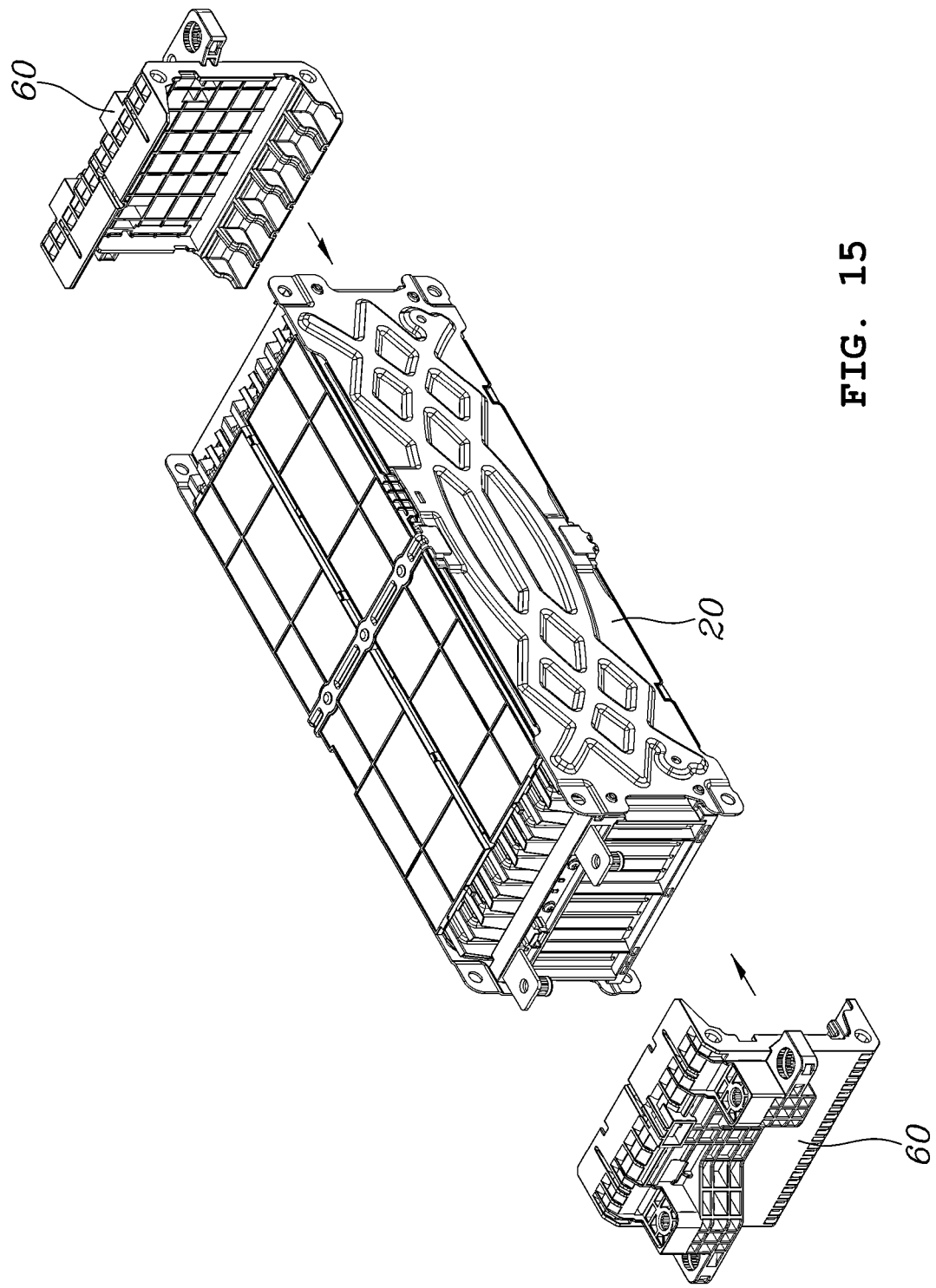
FIG. 15 is a perspective view showing a positional relationship of a second cover, a third cover, and a stacked structure of a battery module according to an exemplary form of the present disclosure.

FIG. 15 is a perspective view showing a positional relationship of a second cover, a third cover, and a stacked structure of a battery module according to an exemplary form of the present disclosure.

As shown in FIG. 15, the second and third covers 60 may be arranged at opposite ends of the stacked structure 100 in the second direction perpendicular to a direction in which the stacked structure 100 of battery cells is stacked, that is, in a direction in which the electrodes 111a and 111b of the battery cell 110 are connected to each other. Here, the second and third covers 60 are substantially the same components that are installed at symmetrical positions of the battery module 10, and thus may be denoted by the same reference numeral.

The battery module 10 may be lastly completed by installing the second and third covers 60 to cover the bus bar assemblies 30. The second and third covers 60 may include through holes for exposing elements therethrough (e.g., a portion of a bus bar that needs to be exposed for external electrical connection or a connector for providing information on detection of a cell voltage) which need to be exposed out of the battery module among elements included in the bus bar assemblies 30.

Figure 16:
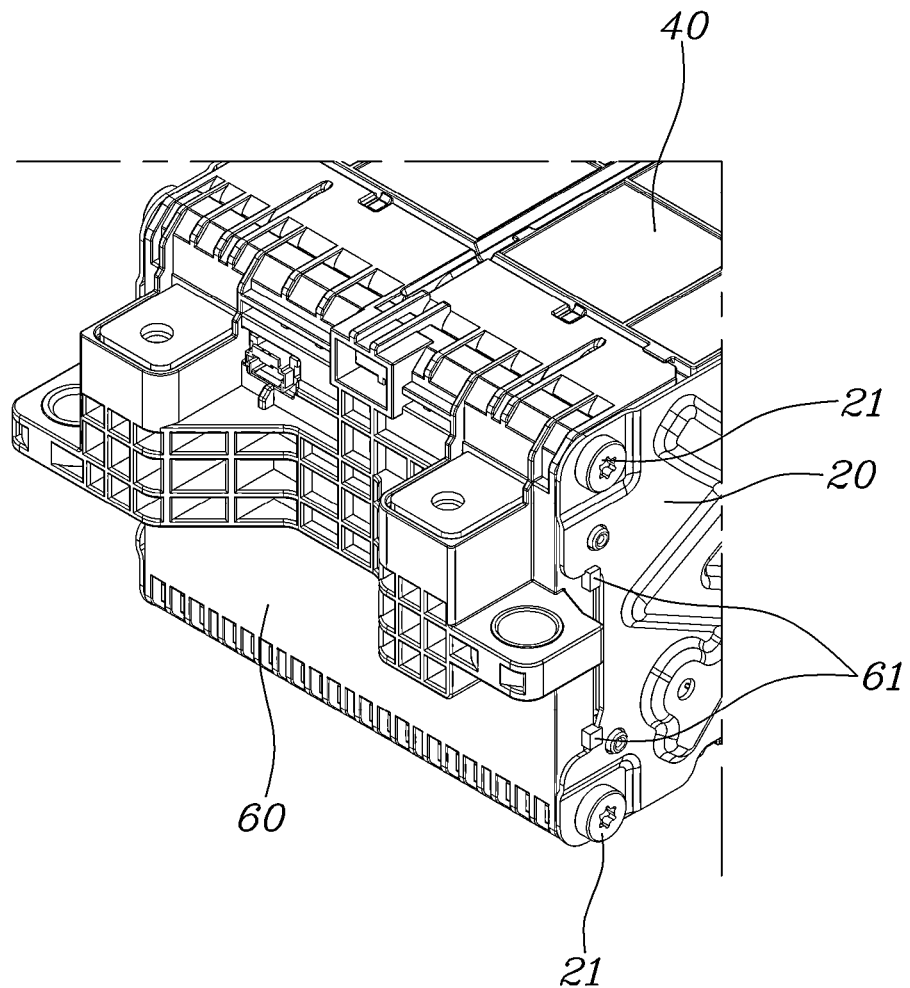
FIG. 16 is a detailed diagram showing a structure in which a second cover and a third cover are assembled with each other in a battery module according to an exemplary form of the present disclosure.

FIG. 16 is a detailed diagram showing a structure in which a second cover and a third cover are assembled with each other in a battery module according to another form of the present disclosure.

As shown in FIG. 16, a lateral portion of the second and third covers 60 may come into contact with the end plate 20. The end plate 20 and the lateral portion of the second and third covers 60 may be coupled to each other by the bolts 21. Although not shown, in the two end plates 20, the bolts 21 may be coupled to opposite ends of one long nut disposed inside the covers 60.

Protrusions 61 protruding in the first direction may be formed on the lateral portion of the second and third covers 60, and an edge of the end plate 20 may be caught by the protrusions 61 to achieve assembly therebetween.

Figure 17:
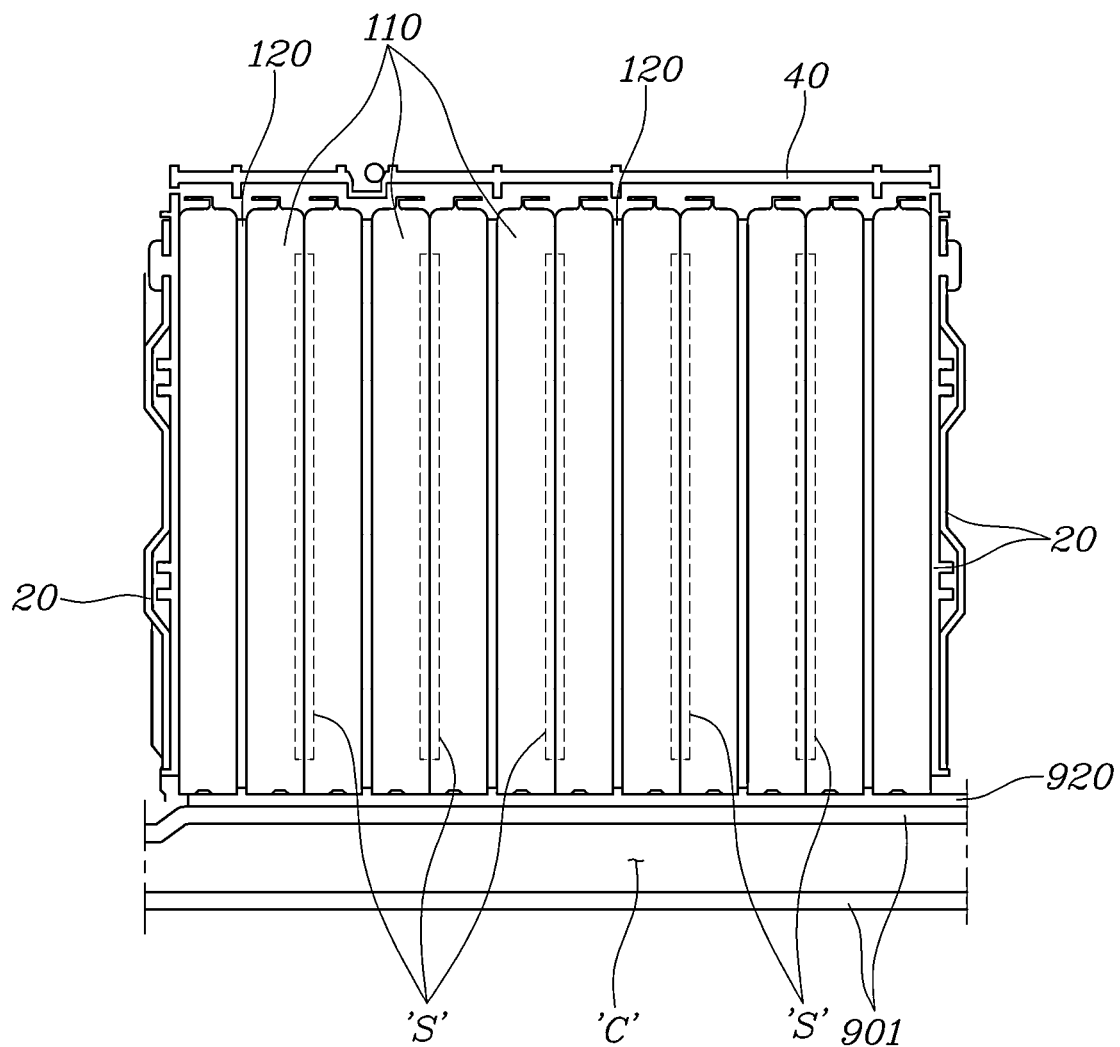
FIG. 17 is a cross-sectional view showing a portion of a battery pack in which a battery module is accommodated according to an exemplary form of the present disclosure.

FIG. 17 is a cross-sectional view showing a portion of a battery pack in which a battery module is accommodated according to another form of the present disclosure. In particular, FIG. 17 is a cross-sectional view of a battery module and a case of a battery pack taken along a line AA' shown in FIG. 1 in the state in which the battery module is accommodated in the case of the battery pack.

As shown in FIG. 17, the battery module 10 according to one form of the present disclosure may be accommodated in a case 910 of the battery pack. A bottom surface of the case 910 of the battery pack may be an accommodation surface on which the battery module 10 is accommodated.

As described above, the battery module 10 may be configured to expose the battery cells 110 rather than including a separate cover one surface in the third direction. The battery module 10 may be accommodated in the battery pack to position the surface, through which the battery cells 110 are exposed, to face the accommodation surface. When the battery module is accommodated, the battery cells 110 of the battery module 10 and the accommodation surface of the case 910 may indirectly contact each other by filling a gap filler 920 between the accommodation surface of the case 910 of the battery pack and the exposed portion of the battery module.

Here, the gap filler 920 may be a thermal interface material for transferring heat generated from the battery cells 110 to the case 910. The heat generated from the battery cells 110 may be more easily dissipated through connection between the battery cells 110 and the accommodation surface (the bottom surface) of the case 910 by the gap filler 920 without other interference elements.

A cooling channel C through which cooling water flows may be formed in a region corresponding to a lower portion of the accommodation surface of the battery module of the case 910 of the battery pack, thereby further improving an effect of dissipating heat generated from the battery cells 110.

In particular, according to various forms of the present disclosure, a stacked state may be fixed by coating hot melt between the battery cells 110 when a stacked structure is manufactured by stacking the battery cells 110, and thus, the battery cells included in the stack structure may be stably maintained without misalignment between the battery cells. In FIG. 17, reference numeral 'S' indicates the position of a bonding surface on which the hot melt is coated. Accordingly, the accommodation surface of the module of the case 910 of the battery pack and all of the battery cells 110 in the stacked structure may come into contact with each other by the gap filler 920, and thus cooling mismatch may not occur and heat generated from the battery module may be stably dissipated through the cooling channel.

As described above, in the battery module and the battery pack including the same according to the various forms of the present disclosure, sufficient rigidity may be provided by welding the clamp to the end plates at opposite sides and coupling the end plates to the cover at opposite sides by bolts at the center of the battery module in a direction in which battery cells are stacked.

In the battery module and the battery pack including the same according to the various forms of the present disclosure, the electrical connection between electrodes may be achieved by a single bending process and a single welding process by applying the bus bar assemblies, and accordingly, a manufacturing process may be simplified and a result deviation between battery cells may be removed, thereby improving product quality.

In the battery module and the battery pack including the same according to the various forms of the present disclosure, battery cells included in a battery pack may be manufactured in the form of a module, and thus, even if specifications of the battery pack are changed depending on a vehicle type, a standardized battery cell may be applied to battery packs of various specifications, and accordingly, a separate design process for arranging the battery cells in the battery pack may be omitted, thereby reducing a development period and development cost.

In the battery module and the battery pack including the same according to the various forms of the present disclosure, the battery cells in the battery module may come into contact into the accommodation surface of the case of the battery pack by a gap filler without other interference elements, and accordingly the heat generated from the battery cells may be more effectively dissipated.

In the battery module and the battery pack including the same according to the various forms of the present disclosure, relative positions between the stacked battery cells may be stably fixed by coating hot melt on at least a portion of the stacked battery cell when a stacked structure is manufactured by stacking the battery cells, and thus even if a load is applied to the stacked structure during a process of manufacturing a battery module or a process of manufacturing a battery pack including a battery module after cells are stacked, it is possible to prevent the stacked structure from being deformed or misalignment between the stacked cells.

In the battery module and the battery pack including the same according to the various forms of the present disclosure, sufficient rigidity may be provided by welding the clamp to the end plates at opposite sides and coupling the end plates to the cover at opposite sides through bolts at the center of the battery module in a direction in which battery cells are stacked.

In the battery module and the battery pack including the same according to the various forms of the present disclosure, the electrical connection between electrodes may be achieved through a single bending process and a single welding process by applying the bus bar assemblies, and accordingly, a manufacturing process may be simplified and a result deviation between battery cells may be removed, thereby improving product quality.

In the battery module and the battery pack including the same according to the various forms of the present disclosure, battery cells included in a battery pack may be manufactured in the form of a module, and thus, even if specifications of the battery pack are changed depending on a vehicle type, a standardized battery cell may be applied to battery packs of various specifications, and accordingly, a separate design process for arranging the battery cells in the battery pack may be omitted, thereby reducing a development period and development cost.

In the battery module and the battery pack including the same according to the various forms of the present disclosure, the battery cells in the battery module may come into contact into the accommodation surface of the case of the battery pack through a gap filler without other interference elements, and accordingly the heat generated from the battery cells may be more effectively dissipated.

In the battery module and the battery pack including the same according to the various forms of the present disclosure, relative positions between the stacked battery cells may be stably fixed by coating hot melt on at least a portion of the stacked battery cell when a stacked structure is manufactured by stacking the battery cells, and thus even if a load is applied to the stacked structure during a process of manufacturing a battery module or a process of manufacturing a battery pack including a battery module after cells are stacked, it is possible to prevent the stacked structure from being deformed or misalignment between the stacked cells.

It will be appreciated by those skilled in the art that the effects achievable through the present disclosure are not limited to those that have been particularly described hereinabove and that other unmentioned effects of the present disclosure will be more clearly understood from the above detailed description.

Although the present disclosure has been shown and described with respect to specific forms, it will be apparent to those having ordinary skill in the art that the present disclosure may be variously modified and altered without departing from the spirit and scope of the present disclosure.

What is claimed is:
1. A battery module comprising:
a plurality of battery cells stacked on one another in a first direction and configured to form a stacked structure, wherein some battery cells of the plurality of battery cells are coated with hot melt respectively interposed between battery cells of the plurality of battery cells to fix the battery cells of the plurality of battery cells;

a pair of end plates configured to respectively surface-contact with opposite end battery cells of the stacked structure in the first direction;

a pair of bus bar assemblies arranged at opposite ends of the stacked structure in a second direction perpendicular to the first direction and configured to connect electrodes of the plurality of battery cells located at opposite ends in the second direction to each other;

a first cover for covering one surface of the stacked structure in a third direction perpendicular to the first direction and the second direction; and second and third covers configured to cover the stacked structure in the second direction at an outside of the pair of bus bar assemblies respectively, upper and lower ends of which are bent to cover a top and a bottom of the stacked structure.

2. The battery module of claim 1, wherein the stacked structure includes a plurality of cell assemblies including a pair of battery cells stacked across a surface pressure pad interposed therebetween, and wherein the plurality of cell assemblies is stacked in the first direction.

3. The battery module of claim 2, wherein, in each cell assembly of the plurality of cell assemblies, the pair of battery cells are stacked to position respective electrodes having the same polarity adjacent to each other.

4. The battery module of claim 2, wherein the plurality of cell assemblies in the stacked structure are stacked on one another to arrange respective electrodes having different polarities adjacent to each other.

5. The battery module of claim 2, wherein the hot melt is coated between the stacked cell assemblies.

6. The battery module of claim 1, wherein the hot melt is coated to have a plurality of rows in a direction parallel to a lengthwise side of a bonding surface of the battery cells that surface-contact each other.

7. The battery module of claim 1, wherein the hot melt is coated in a matrix pattern having a plurality of columns and a plurality of rows parallel to each side of a bonding surface of the battery cells that surface-contact each other.

8. The battery module of claim 1, further comprising:

a first clamp including opposite ends that are respectively bonded to the pair of end plates across the first cover at an outside of the first cover; and a second clamp including opposite ends that are respectively bonded to the pair of end plates across a surface of the stacked structure, which faces the surface on which the first cover is disposed.

9. The battery module of claim 8, wherein each of the pair of end plates comprises an internal plate that surface-contacts the stacked structure and is formed of an insulation material, and an external plate that covers the internal plate at an outside of the internal plate and has higher rigidity than a rigidity of the internal plate.

10. The battery module of claim 9, wherein the external plate includes an insert space that is formed at an end adjacent to the first cover, and wherein a temperature sensor spaced apart from the stacked structure at a predetermined interval is inserted into the insert space.

11. The battery module of claim 8, wherein the pair of bus bar assemblies includes a bus bar including a plurality of slits, and wherein regions of the electrodes of the plurality of battery cells, which are positioned through the plurality of slits, are bent and connected to the bus bar.

12. The battery module of claim 8, wherein the pair of bus bar assemblies include a circuit configured to detect a voltage of the plurality of battery cells.

13. The battery module of claim 8, wherein the first clamp is bonded to the first cover, and wherein the opposite ends of the first clamp are bent to respectively face the pair of end plates and to be bonded to outer surfaces of the pair of end plates.

14. The battery module of claim 8, wherein the opposite ends of the second clamp are bent to face the pair of end plates and to be bonded to outer surfaces of the pair of end plates.

15. The battery module of claim 1, wherein the end plate and a lateral portion of the second and third covers are coupled to each other by bolts.

* * * * *